(12) United States Patent
Vo et al.

(10) Patent No.: US 10,875,061 B2
(45) Date of Patent: Dec. 29, 2020

(54) FUME EXTRACTION APPARATUS WITH MOVABLE EXTRACTION APERTURE

(71) Applicant: PAT TECHNOLOGY SYSTEMS INC., Vaudreuil-Dorion (CA)

(72) Inventors: Chau Thien Vo, Roxboro (CA); Anthony Kazazian, Brossard (CA)

(73) Assignee: PAT TECHNOLOGY SYSTEMS INC.

( * ) Notice: Subject to any disclaimer, the term of this patent is extended or adjusted under 35 U.S.C. 154(b) by 458 days.

(21) Appl. No.: 15/672,784

(22) Filed: Aug. 9, 2017

(65) Prior Publication Data

US 2018/0043402 A1 Feb. 15, 2018

Related U.S. Application Data

(60) Provisional application No. 62/372,853, filed on Aug. 10, 2016.

(51) Int. Cl.
*B08B 15/00* (2006.01)
*B23K 26/142* (2014.01)
*B23K 26/16* (2006.01)

(52) U.S. Cl.
CPC ............ *B08B 15/007* (2013.01); *B08B 15/00* (2013.01); *B23K 26/142* (2015.10); *B23K 26/16* (2013.01)

(58) Field of Classification Search
CPC ..... B08B 15/007; B08B 15/00; B23K 26/142; B23K 26/16
USPC ............................ 219/137.41; 454/49, 56, 61
See application file for complete search history.

(56) References Cited

U.S. PATENT DOCUMENTS

| | | | | |
|---|---|---|---|---|
| 2,110,991 A | * | 3/1938 | Gabrielsen | B08B 15/00 454/49 |
| 3,215,100 A | * | 11/1965 | Fabry | F23G 5/0273 110/242 |
| 3,702,503 A | * | 11/1972 | Nichols | D21F 5/00 34/114 |
| 4,381,443 A | * | 4/1983 | Guibert | A47J 39/003 126/110 A |
| 4,455,478 A | * | 6/1984 | Guibert | A47J 39/003 126/21 A |
| 4,505,184 A | | 3/1985 | McDonald | |

(Continued)

FOREIGN PATENT DOCUMENTS

GB 1118212 A * 6/1968 ............ F26B 13/108

*Primary Examiner* — Jimmy Chou
(74) *Attorney, Agent, or Firm* — Norton Rose Fulbright Canada LLP

(57) ABSTRACT

A fume extraction apparatus having an outer conduit with a first elongated open area extending at a first angle and an inner conduit configured for connection to a venting system and received within the outer conduit. The conduits are rotatable relative to one another. The inner conduit has a second elongated open area extending at a second angle different from the first angle. Overlapping portions of the open areas defines an extraction aperture providing a fluid communication between an environment of the outer conduit and an interior of the inner conduit. Different relative orientations of the conduits define different positions of the extraction aperture, so that the extraction aperture is movable upon relative rotation of the inner and outer conduits. A method of extracting fumes during operation of a laser head is also discussed.

19 Claims, 6 Drawing Sheets

(56) References Cited

U.S. PATENT DOCUMENTS

| | | | | |
|---|---|---|---|---|
| 4,526,350 A | * | 7/1985 | Ghoneim | C21C 5/38 |
| | | | | 266/145 |
| 4,529,005 A | * | 7/1985 | Sun | F16K 5/0414 |
| | | | | 137/625.32 |
| 4,561,416 A | * | 12/1985 | Loechner | F24C 15/322 |
| | | | | 126/21 A |
| D285,832 S | * | 9/1986 | Nederman | D23/371 |
| 4,649,955 A | | 3/1987 | Otto et al. | |
| 4,821,704 A | * | 4/1989 | Tucker | B08B 15/007 |
| | | | | 126/299 D |
| 4,949,475 A | * | 8/1990 | Roerig | D21F 5/042 |
| | | | | 34/115 |
| 5,062,419 A | * | 11/1991 | Rider | A61M 16/16 |
| | | | | 128/200.14 |
| D327,122 S | * | 6/1992 | Holmgren | D23/371 |
| 5,211,602 A | * | 5/1993 | Holmgren | B08B 15/002 |
| | | | | 285/114 |
| 5,234,157 A | * | 8/1993 | Fletcher | B23K 3/085 |
| | | | | 219/227 |
| 5,368,560 A | | 11/1994 | Rambo et al. | |
| D357,303 S | * | 4/1995 | Karlsson | D23/209 |
| 5,560,583 A | * | 10/1996 | Holmgren | B08B 15/002 |
| | | | | 248/289.11 |
| 5,876,567 A | * | 3/1999 | Yamamoto | B01D 3/02 |
| | | | | 159/44 |
| D448,839 S | * | 10/2001 | Mishin | D23/371 |
| 6,380,515 B1 | * | 4/2002 | Knoll | B23K 9/325 |
| | | | | 219/137.41 |
| 6,869,063 B2 | * | 3/2005 | Gunnarsson | E21B 34/14 |
| | | | | 251/297 |
| 7,674,164 B2 | * | 3/2010 | Stefani | B60H 1/00564 |
| | | | | 454/154 |
| 8,840,752 B2 | | 9/2014 | Ogata et al. | |
| 9,022,025 B2 | * | 5/2015 | Hipol | B63C 11/2227 |
| | | | | 128/201.11 |
| 9,839,948 B2 | * | 12/2017 | Leisner | B08B 15/002 |
| 9,845,592 B2 | * | 12/2017 | Wiwi | B08B 9/053 |
| 10,475,641 B2 | * | 11/2019 | Fukushima | C23C 16/4412 |
| 10,478,871 B2 | * | 11/2019 | Wiwi | B08B 9/053 |
| 2002/0088351 A1 | * | 7/2002 | Flannery | F24C 15/20 |
| | | | | 99/495 |
| 2003/0029321 A1 | * | 2/2003 | Mishin | B01D 46/0005 |
| | | | | 96/142 |
| 2003/0152500 A1 | * | 8/2003 | Dalziel | A23J 3/16 |
| | | | | 422/245.1 |
| 2005/0272363 A1 | * | 12/2005 | Bisson | B08B 15/00 |
| | | | | 454/65 |
| 2006/0108011 A1 | * | 5/2006 | George | F16K 11/0856 |
| | | | | 137/625.21 |
| 2007/0056942 A1 | * | 3/2007 | Daniel | B23K 9/1062 |
| | | | | 219/125.1 |
| 2010/0006753 A1 | | 1/2010 | Schroeder | |
| 2010/0230953 A1 | * | 9/2010 | Baylot | F16L 9/18 |
| | | | | 285/120.1 |
| 2010/0254826 A1 | * | 10/2010 | Streng | F04D 25/06 |
| | | | | 417/44.1 |
| 2010/0282728 A1 | * | 11/2010 | Cole | B08B 15/04 |
| | | | | 219/133 |
| 2012/0193334 A1 | * | 8/2012 | Mehn | B23K 9/325 |
| | | | | 219/130.21 |
| 2012/0270716 A1 | * | 10/2012 | Kauppila | B65H 27/00 |
| | | | | 493/454 |
| 2013/0073071 A1 | * | 3/2013 | Culp | B23K 26/083 |
| | | | | 700/108 |
| 2013/0244560 A1 | * | 9/2013 | Hammers | B08B 15/02 |
| | | | | 454/63 |
| 2015/0000232 A1 | * | 1/2015 | Hammers | B01D 49/00 |
| | | | | 55/385.1 |
| 2015/0004895 A1 | * | 1/2015 | Hammers | B23K 9/16 |
| | | | | 454/49 |
| 2016/0169423 A1 | * | 6/2016 | Wu | F16F 9/43 |
| | | | | 137/231 |
| 2016/0193635 A1 | * | 7/2016 | Mate | B23K 37/0461 |
| | | | | 454/63 |
| 2017/0014876 A1 | * | 1/2017 | Moon | B08B 15/002 |
| 2017/0016640 A1 | * | 1/2017 | Moon | B08B 15/002 |
| 2017/0173647 A1 | * | 6/2017 | Varley | F24F 7/00 |
| 2017/0321404 A1 | * | 11/2017 | Wiwi | B08B 9/053 |
| 2018/0099318 A1 | * | 4/2018 | Wiwi | B08B 9/055 |
| 2018/0318964 A1 | * | 11/2018 | Vogler | B23K 26/38 |
| 2019/0134684 A1 | * | 5/2019 | Gonzalez | B08B 15/02 |

* cited by examiner

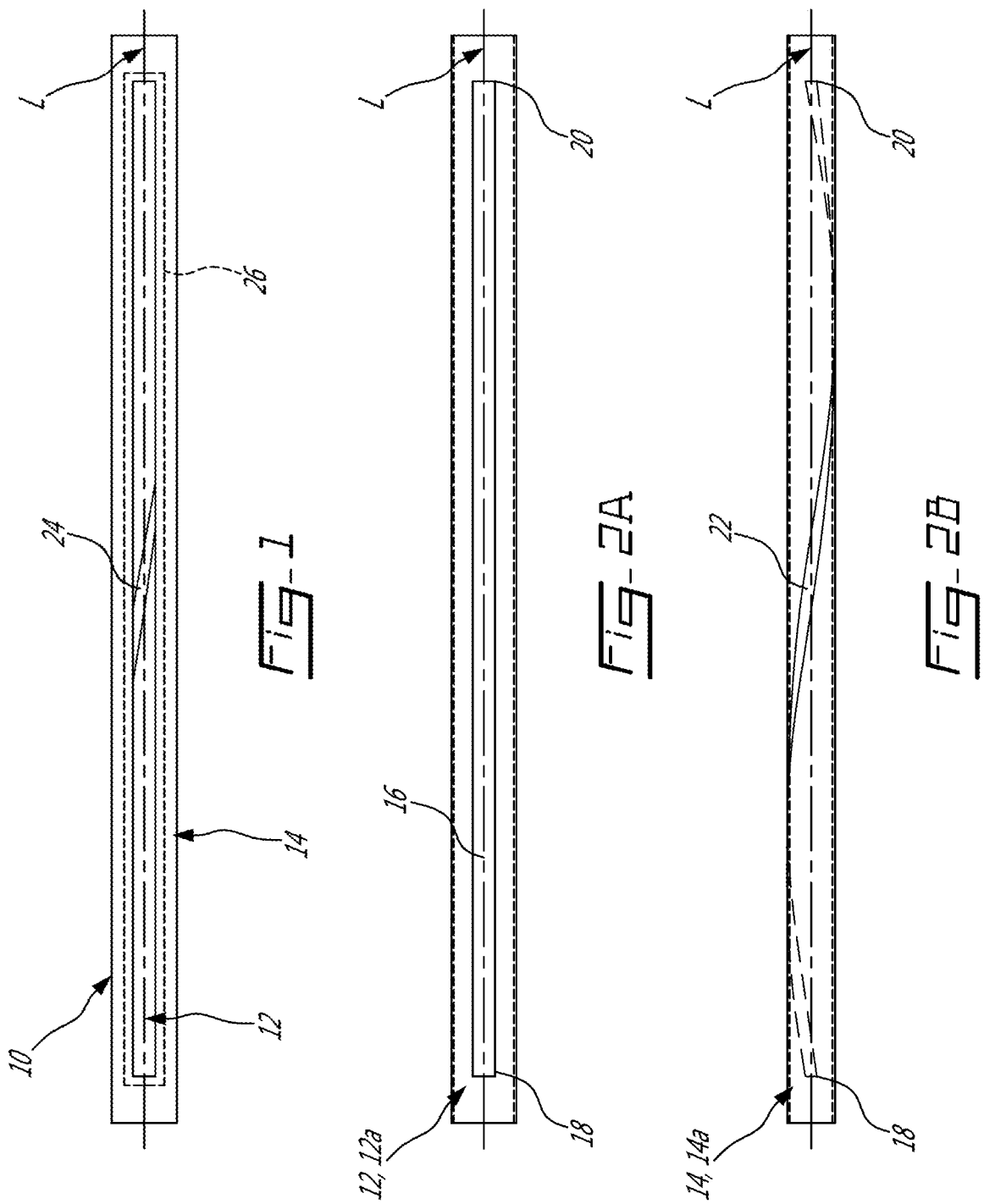

FUME EXTRACTION APPARATUS WITH MOVABLE EXTRACTION APERTURE

CROSS-REFERENCE TO RELATED APPLICATIONS

This application claims priority from U.S. provisional application No. 62/372,853 filed Aug. 10, 2016, the entire contents of which are incorporated by reference herein.

TECHNICAL FIELD

The application relates generally to fume extraction and, more particularly, to fume extraction for laser machining or other movable contaminant sources.

BACKGROUND OF THE ART

Currently, laser machines are used to cut and etch patterns on many materials for industrial and non-industrial purposes alike. One concern which must be addressed with regards to any laser machine is fume extraction as contaminants are released by the laser's interaction with the work material. These contaminants can be detrimental to the health of users and affect the quality of work being done. For small applications, the entire machine can be sealed within an enclosure and the contaminated air extracted, then sent outside or to a filter. However for larger machines, it may be impractical to enclose the entire workspace.

It is known to use a downdraft table to remove contaminated air from a workspace. However, downdraft tables may have limited efficiency with respect to fume extraction, for example because of the large area and/or because the machined material can block the entrance and prevent fumes from being extracted by the system.

It is also known to mount a hose directly to a laser head to extract the contaminants released by the laser's interaction with the work material. However, the size and mass of the hose and associated equipment required to perform fume extraction can be significant, and this mass may reduce the precision and/or the speed of operation of the laser head to which the hose and equipment is mounted.

SUMMARY

In one aspect, there is provided a fume extraction apparatus comprising: an outer conduit including a first wall having a first elongated open area defined therethrough, the first elongated open area extending between two longitudinally spaced apart locations at a first angle with respect to a longitudinal axis; and an inner conduit configured for connection to a venting system and received within the outer conduit, the inner and outer conduits rotatable relative to one another about the longitudinal axis, the inner conduit having a cylindrical second wall, the first and second walls being in sealing engagement with each other around the first elongated area, the second wall having a second elongated open area defined therethrough, the second elongated open area extending between the two longitudinally spaced apart locations at a second angle with respect to the longitudinal axis, the first angle being different from the second angle; wherein overlapping portions of the first and second elongated open areas define an extraction aperture providing a fluid communication between an environment of the outer conduit and an interior of the inner conduit; wherein the extraction aperture is movable along a direction of the longitudinal axis between the two longitudinally spaced apart locations upon relative rotation of the inner and outer conduits.

In another aspect, there is provided a fume extraction apparatus comprising: an outer conduit including a first wall having at least one first opening defined therein, the at least one first opening forming a first elongated open area extending between two longitudinally spaced apart locations at a first angle with respect to a longitudinal axis; and an inner conduit configured for connection to a venting system and received within the outer conduit, the inner and outer conduits rotatable relative to one another about the longitudinal axis, the inner conduit having a cylindrical second wall extending along a length of the inner conduit, the first and second walls being in sealing engagement with each other around the first elongated area, the second wall having at least one second opening defined therein, the at least one second opening forming a second elongated open area extending between the two longitudinally spaced apart locations at a second angle with respect to the longitudinal axis, the first angle being different from the second angle; wherein overlapping portions of the first and second elongated open areas define an extraction aperture providing a fluid communication between an environment of the outer conduit and an interior of the inner conduit; wherein different relative orientations of the inner and outer conduits around the longitudinal axis define different positions of the extraction aperture along a direction of the longitudinal axis.

In a further aspect, there is provided a method of extracting fumes during operation of a laser head, the method comprising: providing a fume extraction apparatus in proximity of the laser head, the apparatus including an outer conduit and an inner conduit sealingly engaged therein, the outer and inner conduits including differently oriented open areas extending along a longitudinal axis corresponding to an axis of movement of the laser head; performing a relative rotation between the outer and inner conduits to change a location of overlapped portions of the open areas along the longitudinal axis so that the overlapped portions of the open areas are aligned with the laser head along the longitudinal axis during the movement of the laser head; and extracting the fumes from an environment of the laser head through the overlapped portions of the open areas, into the inner conduit and to a venting system.

DESCRIPTION OF THE DRAWINGS

Reference is now made to the accompanying figures in which:

FIG. 1 is a schematic front view of a fume extraction apparatus in accordance with a particular embodiment;

FIG. 2a is a schematic front view of an outer conduit of the fume extraction apparatus of FIG. 1;

FIG. 2b is a schematic front view of an inner conduit of the fume extraction apparatus of FIG. 1;

DETAILED DESCRIPTION

Figure 3:
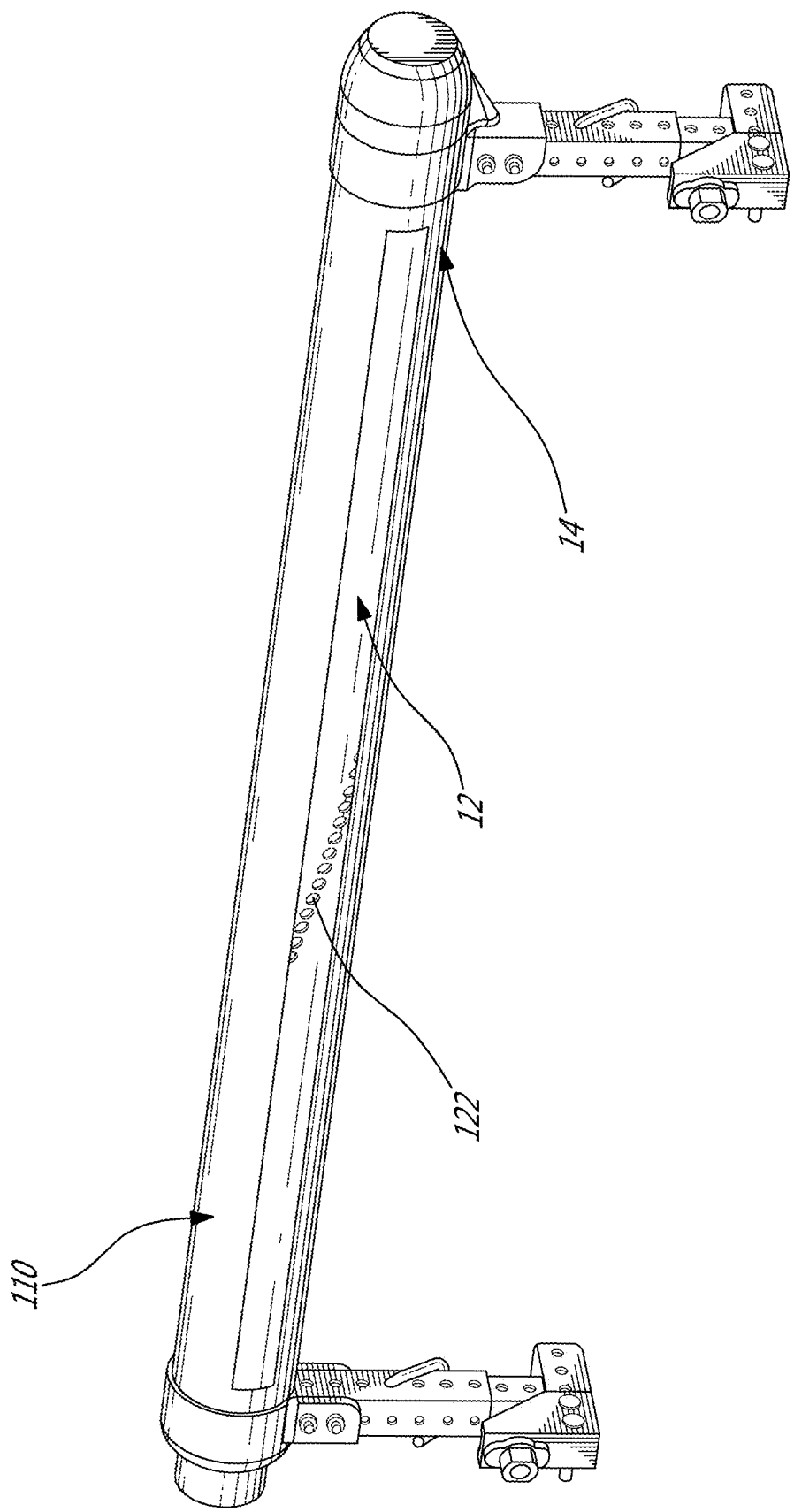
FIG. 3 is a schematic tridimensional view of a fume extraction apparatus in accordance with another particular embodiment.

In a particular embodiment, the present description provides for a fume extraction apparatus which is particularly, although not exclusively, suitable to allow clearing of the air without disturbing a laser head in an open flatbed laser machine. The fume extraction apparatus defines an extraction aperture able to follow the laser head without being connected thereto. In a particular embodiment, the fume extraction apparatus is suitable to be used with a laser head adapted to translate and change direction rapidly along the gantry, for example during an etching operation.

The limitations of velocity and acceleration of the laser head are based on the mass of the head itself; a massive object (e.g. a fume hood) needs to overcome its own inertia to "keep up" with the laser head enough for sufficient fume capture, which may be impractical and/or expensive to do. By contrast, the fume extraction apparatus discussed herein defines an extraction aperture able to move along an axis without requiring translation of a mass along that axis. Accordingly, in a particular embodiment the extraction aperture is able to move along the longitudinal axis of the apparatus at high speed in order to follow the laser head along that axis.

Referring to FIG. 1, a particular embodiment of the fume extraction apparatus 10 is shown. The apparatus generally includes an outer conduit 12 and an inner conduit 14 received within the outer conduit 12. Both conduits 12, 14 are elongated and extend parallel to one another. In the embodiment shown, both conduits 12, 14 are cylindrical and concentric. The inner conduit 14 is configured for connection to a venting system, and the conduits 12, 14 are rotatable relative to one another about a longitudinal axis L, which in the embodiment shown corresponds to the central axis of both conduits 12, 14. In the embodiment shown, the outer conduit 12 is fixed, and the inner conduit 14 is rotatable.

Referring to FIG. 2a, the outer conduit 12 has a wall 12a extending along its length. In the embodiment shown, the wall 12a is annular with a circular cross-section. It is understood that other shapes can be used; for example, the outer conduit 12 may have a square cross-section, in which case the wall would include four (4) interconnected panels forming the closed perimeter of the cross-section.

The outer conduit 12 includes an elongated open area 16 extending longitudinally between two spaced apart locations 18, 20. In the embodiment shown, the elongated open area 16 is defined by a single elongated opening or slot extending along a direction parallel to the longitudinal axis L.

Referring to FIG. 2b, the inner conduit 14 also has a wall 14a extending along its length; the wall 14a is annular with a circular cross-section. The inner conduit 14 also includes an elongated open area 22 extending longitudinally between the two spaced apart locations 18, 20. This open area 22 extends at a different angle with respect to the longitudinal axis L than the open area 16 of the outer conduit 12. Accordingly, the open areas 16, 22 have portions that overlap one another, but cannot be completely in alignment with each other. In the embodiment shown, the open area 22 of the inner conduit 14 is defined by a single elongated opening or slot which extends along a helical path.

Referring back to FIG. 1, the overlapping portions of the open areas 16, 22 define a nozzle or extraction aperture 24 which provides a fluid communication between the environment of the outer conduit 12 and an interior of the inner conduit 14, and accordingly the venting system connected thereto. Because of the different orientations of the open areas 16, 22 with respect to the longitudinal axis L, it can be seen that different relative orientations of the conduits 12, 14 will define different positions along the longitudinal axis L for the overlap between the open areas 16, 22, and accordingly for the extraction aperture 24 defined by this overlap. The position of the overlap of the open areas 16, 22 along the longitudinal axis changes in a continuous manner, i.e. the overlap can have any position between the two spaced apart locations 18, 20. Accordingly, fume extraction is not performed only in a plurality of discrete spaced apart points between the spaced apart locations 18, 20, but at any position between the two spaced apart locations 18, 20.

In the embodiment shown, the helix defined by the open area 22 of the inner conduit 14 has a pitch equal to that of the conduit 14, i.e. it is angled so as to "wrap" once around the perimeter of the conduit 14. Accordingly, a single overlap of the open areas 16, 22 is always present at any relative orientations of the inner and outer conduits 12, 14. The relative rotation of the conduits 12, 14 provides a controlled "translation" of the overlap of the open areas 16, 22, and accordingly of the extraction aperture 24, along the longitudinal axis L.

Alternately, multiple helical slots could be provided on the inner conduit 14, so as to create multiple extraction apertures.

The walls 12a, 14a of the conduits 12, 14 are sealingly engaged with each other around the open area 16 of the outer conduit 12, for example by a long gasket 26 (FIG. 1) extending inwardly from the wall 12a of the outer conduit 12 at the edges of its open area 16. Accordingly the only communication between the environment of the outer conduit 12 and the interior of the inner conduit 14 is performed through the extraction aperture 24 defined by the overlap of the open areas 16, 22, thus directing all suction produced by the venting system (e.g. fan) connected to the inner conduit 14 through that extraction aperture 24. In a particular embodiment, the conduits 12, 14 are sealed at one end and have an opposed open end connected to ducting leading to the venting system, which may include a filtration system.

In a particular embodiment, an electric motor (not shown) is drivingly engaged to the inner conduit 14, for example at the sealed ends of the conduits 12, 14, to drive the rotation.

Referring to FIG. 3, a fume extraction apparatus 110 in accordance with an alternate embodiment is shown. In this embodiment, the open area 122 of the inner conduit 14 is defined by a row of adjacent openings formed as drilled holes, indexed along the helical path. In a particular embodiment, such a configuration may be easier to manufacture than a continuous helical slot and may provide for a better structural integrity of the inner conduit 14. The size (diameter) of the holes 122 is selected based on the flow of the venting system, in order to obtain the necessary capture range based on the distance in use between the apparatus and the source of the fumes to be extracted. In a particular embodiment, the size and spacing of the holes 122 relative to the size of the slot in the outer conduit 12 is selected so that the position of the overlap of the open areas 16, 122 along the longitudinal axis changes in a continuous manner, i.e. the overlap can have any position between the two spaced apart locations 18, 20, so that fume extraction can be performed at any position along the axis between the two spaced apart locations 18, 20.

Figure 4:
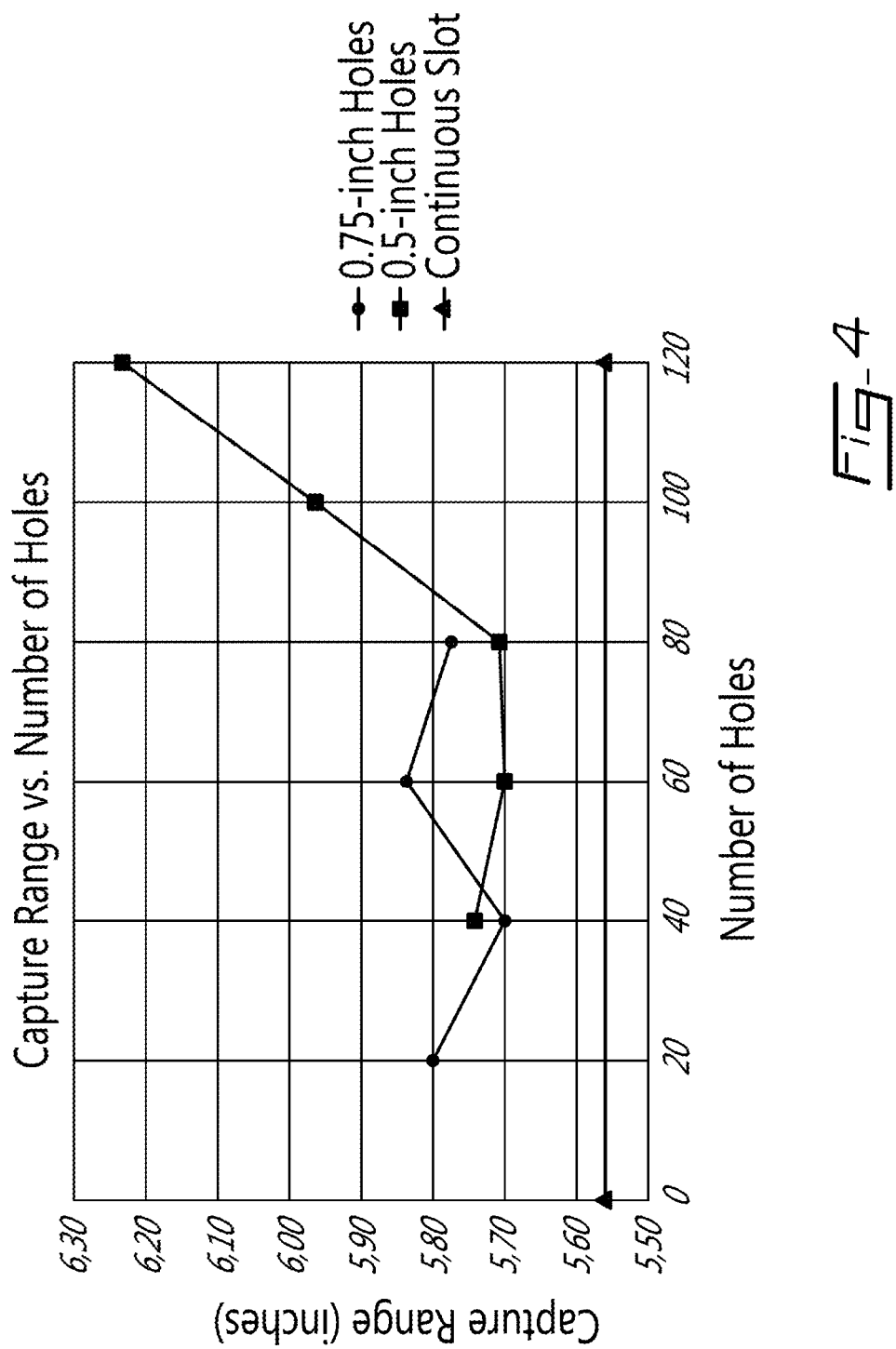
FIG. 4 is a graph comparing a capture range of a fume extraction apparatus such as shown in FIG. 1 with that of a fume extraction apparatus such as shown in FIG. 3.

FIG. 4 shows an example graph of results of a simulation using CFD software, comparing the capture range of an apparatus having an elongated slot as the open area of the inner conduit 14 (such as the apparatus 10 of FIG. 1) to an apparatus having different size and number of holes as the open area of the inner conduit 14 (such as the apparatus 110 of FIG. 3), for a flow of 200 CFM. The results of the test show that for at least some embodiments, the use of adjacent holes to define the open area of the inner conduit 14 provides for an increased capture range as compared to a continuous slot. However, a reduction of opening surface area creates an increase of static pressure.

Figure 5:
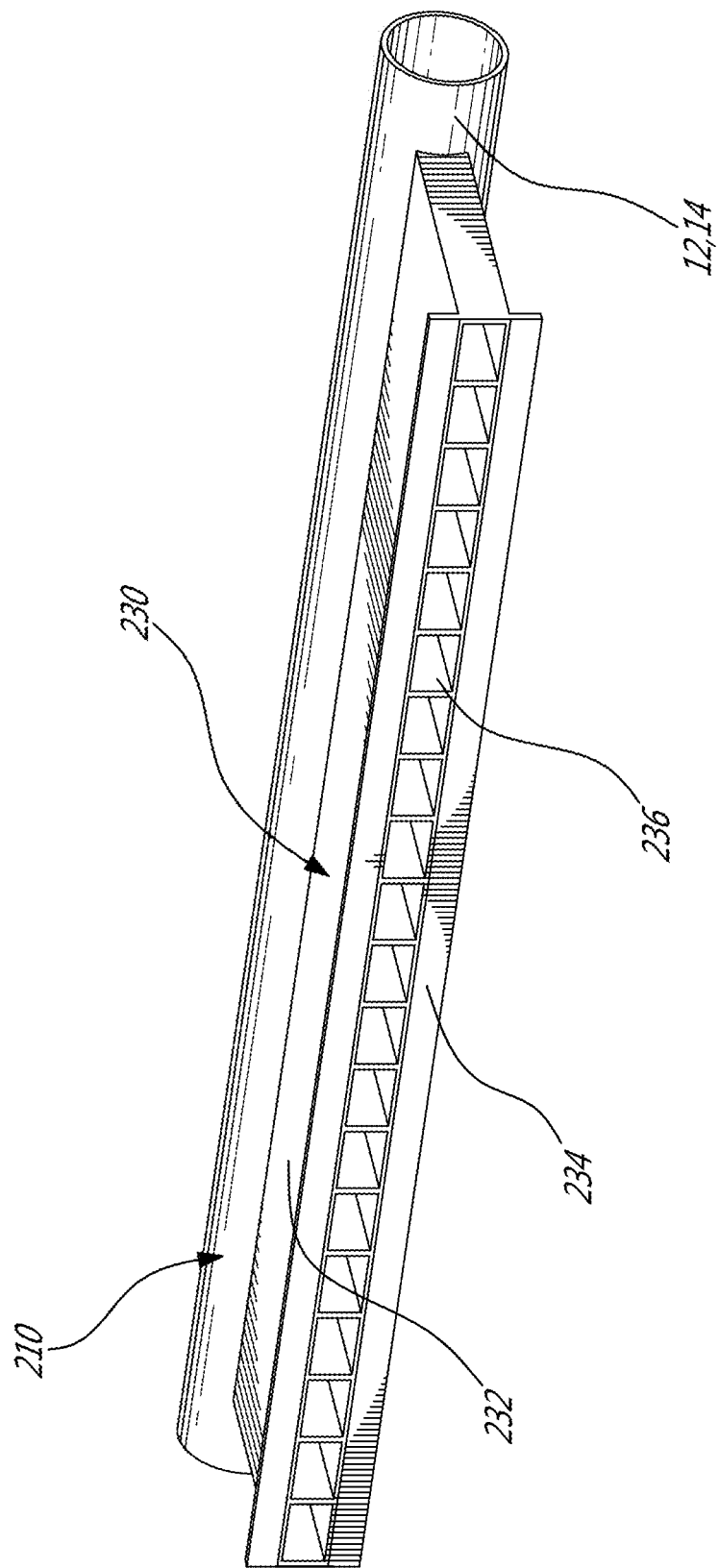
FIG. 5 is a schematic tridimensional view of a fume extraction apparatus in accordance with another particular embodiment.

Referring to FIG. 5, a fume extraction apparatus 210 in accordance with an alternate embodiment is shown. The conduits 12, 14 of this embodiment may be similar to that described above for the embodiments of FIG. 1 or of FIG. 3, and accordingly will not be described further herein.

This embodiment however includes an inlet plenum 230 defined by an inlet wall 232 forming a closed perimeter and extending outwardly from the outer conduit 12 around its open area. A flange 234 is provided at the end of the inlet wall 232. Such an embodiment is particularly suitable for applications where the conduits 12, 14 cannot be positioned sufficiently close to the source of the fumes for efficient extraction, for example for use with laser machines having their laser head "hidden" inside the gantry. The inlet wall 232 accordingly defines a "lip" around the open area of the outer conduit 12 to extend the edges of the open area closer to the source of the fumes, allowing the apparatus 210 to extract fumes in tighter environments.

Figure 6:
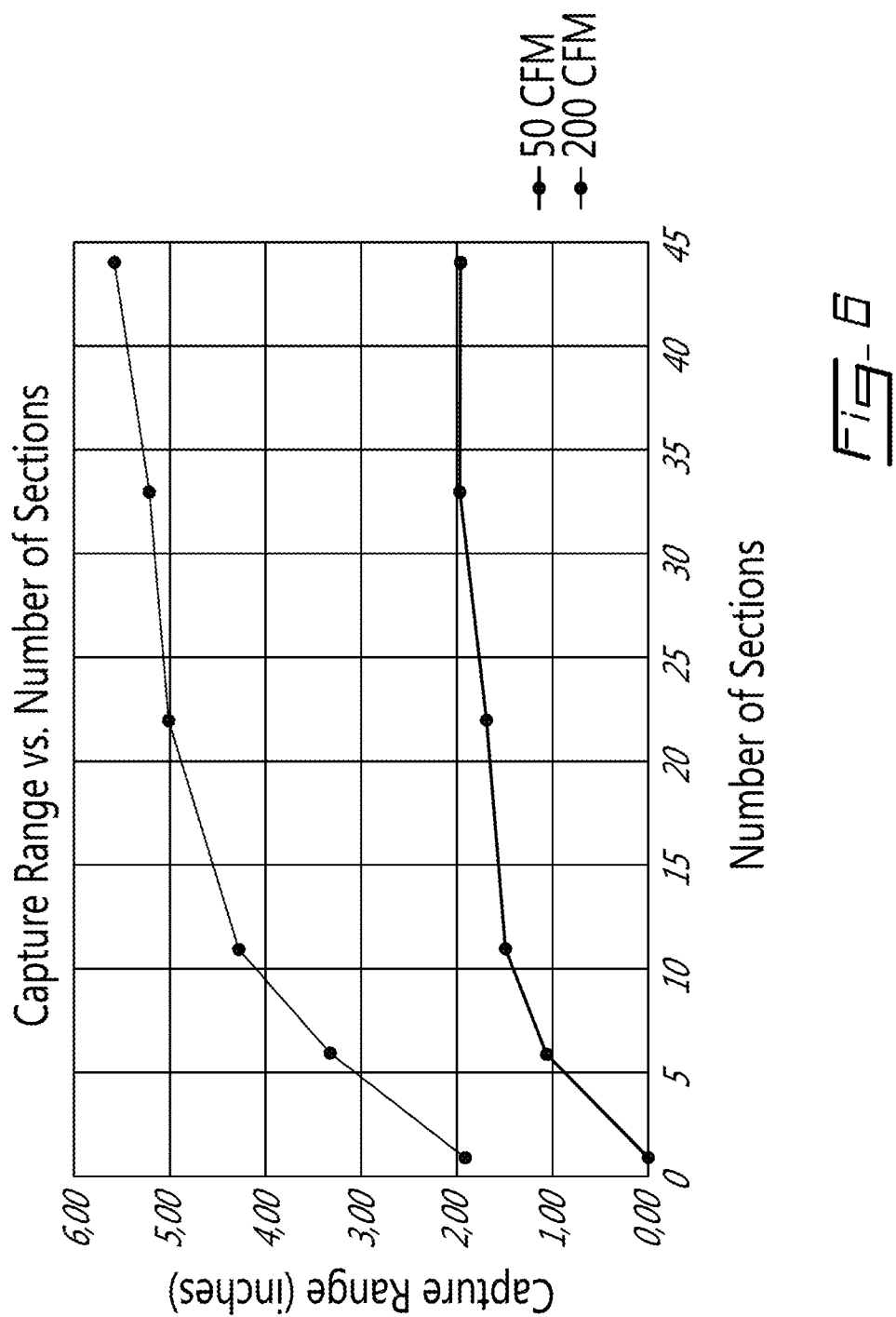
FIG. 6 is a graph comparing a capture range of a fume extraction apparatus such as shown in FIG. 5 with different numbers of sections in an inlet plenum thereof.
Figure 7A:
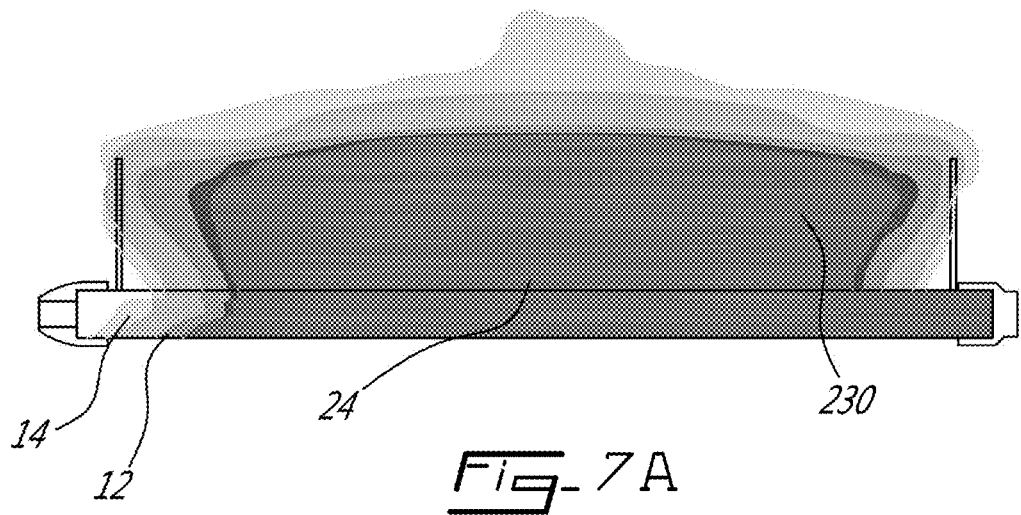
FIG. 7a is a graphical representation of a flow into a fume extraction apparatus such as shown in FIG. 5 but without partitions in the inlet plenum.
Figure 7B:
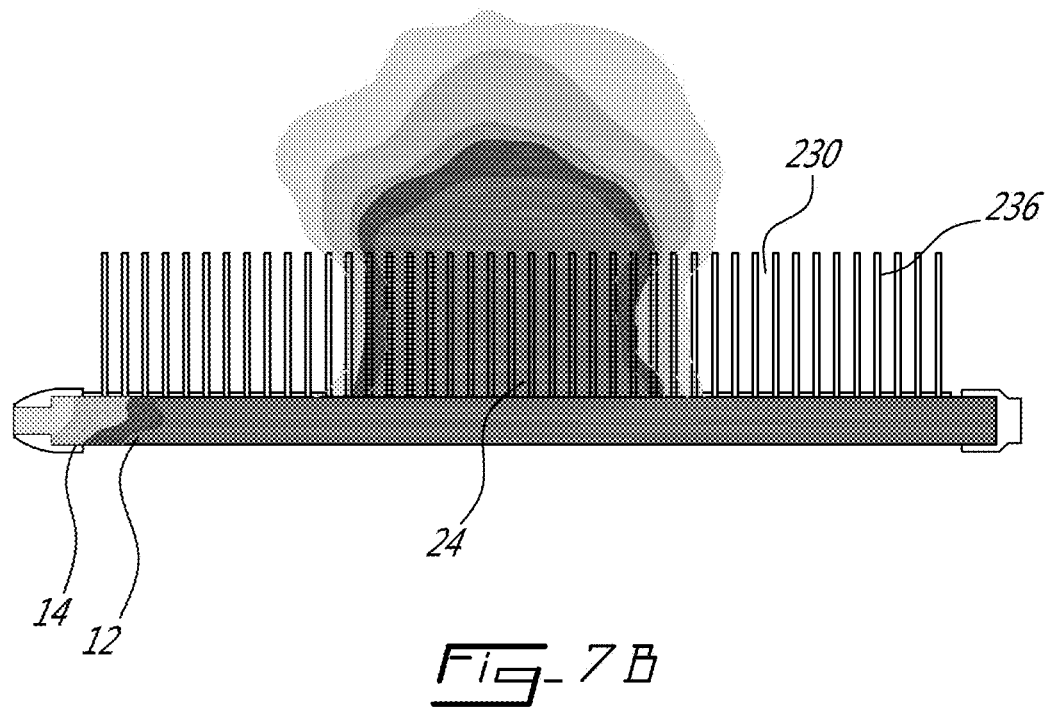
FIG. 7b is a graphical representation of a flow into a fume extraction apparatus such as shown in FIG. 5.

It can be seen that the plenum 230 is divided in sections by a plurality of longitudinally spaced apart partitions 236, in order to restrict the flow and help concentrate the flow to the part of the plenum 230 aligned with the extraction aperture 24. FIG. 6 shows an example graph of results of a simulation using CFD software, comparing the capture range of an apparatus 210 having different numbers of sections in the inlet plenum 230, at two different flows. It can be seen that an increase in sections increases the capture range of the apparatus 210, allowing an improved direction of the flow to the overlapped open areas defining the extraction aperture 24. FIGS. 7a-7b provides an example of graphical illustration comparing the flow without partitions in the plenum 230 (FIG. 7a) to the flow with partitions 236 (FIG. 7b), showing how the partitions 236 help guide the flow.

Although particular configurations have been described, it is understood that multiple variations can be applied. For example, the helical slot(s) or row(s) of holes could be provided on the outer conduit 12 with the inner conduit 14 having the straight slot(s) or row(s) of apertures and with the outer conduit 12 rotatable around the inner conduit 14.

Multiple apparatus 10, 110, 210 can be used and configured serially, in parallel, or radially with respect to one another. The multiple apparatus 10, 110, 210 can be controlled using parallel controls, or independent controls.

When used with a flatbed laser, the apparatus 10, 110, 210 may be installed with the longitudinal axis L oriented along the length of the gantry (x-axis) upon which the laser head is mounted. The gantry is movable along an axis (y-axis) perpendicular to the longitudinal axis during the machining operation, and accordingly the apparatus 10, 110, 210 moves with the laser head and gantry along the y-axis. In another embodiment, the apparatus 10, 110, 210 is mounted on rails or tracks on each side of the table and actuated along the rails or tracks in tandem with the gantry to follow movement of the laser head along the y-axis as performed by the gantry; proximity sensors may be used to maintain a constant distance between the apparatus 10, 110, 210 and the gantry.

Alternately, the apparatus 10, 110, 210 can be used on a laser table with a fixed gantry and a mobile bed, and accordingly the motion along the y-axis is taken care of through movement of the bed.

The extraction aperture 24 can "follow" the movement of the laser head along the x-axis as it cuts or etches the work material. The relative rotation between the conduits 12, 14 is performed to change the location of the overlapped portions of the open areas 16, 22 along the longitudinal axis L so that the overlapped portions of the open areas 16, 22, and accordingly the extraction aperture 24, are aligned with the laser head along the longitudinal axis L during the movement of the laser head; the relative rotation of the conduits 12, 14 allows for translation of the extraction aperture 24 without the need to displace a mass along the longitudinal axis L and accordingly without the need to overcome significant inertia. In a particular embodiment, the only resistance to the rotation of the conduit(s) 12, 14, apart from the rotational inertia, is friction with the sealing components; however this represents significantly less energy than a translation of mass along the longitudinal axis L. As the extraction aperture 24 follows the laser head, the fumes can be extracted from the environment of the laser head through the aperture 24, into the inner conduit 14 and to the venting system.

In a particular embodiment, one or more sensor(s) and computer(s) can be used to track the position of the laser head along the x-axis in real time and send the required signal(s) to actuate the rotation of the inner conduit 14, for example to the motor driving its rotation or to mechanical linkages providing the rotation, to "move" the extraction aperture 24 along the x-axis to position sufficiently close to the laser head to perform the fume extraction at its source and pull in the contaminated air.

A CFD simulation was run to compare the capture range of the apparatus 10, 110, 210 described herein to that of a single conduit having an elongated slot (e.g., the outer conduit 12 alone), to determine the effect of the presence of the inner conduit 14 and of the flow restriction created by the moving overlap in open areas 16, 22. It was found that the apparatus 10, 110, 210 including the inner conduit 14 has a fume capture range around 5.5 inches at 200 CFM; whilst at the same flow rate the outer conduit 12 used alone could achieve a capture range of less than 1 inch. Furthermore, even at 2000 CFM (and an associated very high static pressure) the outer conduit 12 alone could only manage a fume capture range of around 2 inches. Accordingly, the combination of the inner and outer conduits 14, 12 with the moving overlapping open areas 16, 22 provides for a significant improvement in capture range as opposed to a single slotted conduit.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A fume extraction apparatus comprising:
   an outer conduit including a first wall having a first elongated open area defined therethrough, the first elongated open area extending between two longitudinally spaced apart locations at a first angle with respect to a longitudinal axis; and an inner conduit configured for connection to a venting system and received within the outer conduit, the inner conduit and the outer conduit rotatable relative to one another about the longitudinal axis, the inner conduit having a cylindrical second wall, the first wall and the cylindrical second wall being in sealing engagement with each other around the first elongated open area, the cylindrical second wall having a second elongated open area defined therethrough, the second elongated open area extending between the two longitudinally spaced apart locations at a second angle with respect to the longitudinal axis, the first angle being different from the second angle;

wherein overlapping portions of the first elongated open area and the second elongated open area define an extraction aperture providing a fluid communication between an environment of the outer conduit and an interior of the inner conduit;

wherein the second elongated open area extends along a helical path;

wherein the extraction aperture is movable along a direction of the longitudinal axis between the two longitudinally spaced apart locations upon relative rotation of the inner and outer conduits.

2. The fume extraction apparatus as defined in claim 1, wherein the extraction aperture is movable along the direction of the longitudinal axis in a continuous manner upon relative rotation of the inner conduit and the outer conduit.

3. The fume extraction apparatus as defined in claim 1, wherein the inner conduit and the outer conduit are cylindrical and concentric.

4. The fume extraction apparatus as defined in claim 1, wherein the first elongated open area is defined by a single elongated opening extending through the first wall.

5. The fume extraction apparatus as defined in claim 1, wherein the second elongated open area is defined by multiple openings extending through the second wall.

6. The fume extraction apparatus as defined in claim 5, wherein the multiple openings include a row of adjacent holes.

7. The fume extraction apparatus as defined in claim 1, wherein the first elongated open area extends along a direction parallel to the longitudinal axis.

8. The fume extraction apparatus as defined in claim 1, wherein the outer conduit is fixed, and the inner conduit is rotatable.

9. The fume extraction apparatus as defined in claim 1, further comprising an inlet plenum defined by an inlet wall forming a closed perimeter extending outwardly from the first wall of the outer conduit around the first elongated open area, the plenum being divided by a plurality of longitudinally spaced apart partitions.

10. The fume extraction apparatus as defined in claim 1, further comprising a motor drivingly engaged to one of the inner conduit and the outer conduit to perform the relative rotation therebetween.

11. A fume extraction apparatus comprising:

an outer conduit including a first wall having at least one first opening defined therein, the at least one first opening forming a first elongated open area extending between two longitudinally spaced apart locations at a first angle with respect to a longitudinal axis; and an inner conduit configured for connection to a venting system and received within the outer conduit, the inner conduit and the outer conduit rotatable relative to one another about the longitudinal axis, the inner conduit having a cylindrical second wall extending along a length of the inner conduit, the first wall and the cylindrical second wall being in sealing engagement with each other around the first elongated open area, the cylindrical second wall having at least one second opening defined therein, the at least one second opening forming a second elongated open area extending between the two longitudinally spaced apart locations at a second angle with respect to the longitudinal axis, the first angle being different from the second angle;

wherein overlapping portions of the first elongated open areas and the second elongated open area define an extraction aperture providing a fluid communication between an environment of the outer conduit and an interior of the inner conduit;

wherein a motor is drivingly engaged to one of the inner conduit and the outer conduit to perform the relative rotation therebetween;

wherein different relative orientations of the inner and outer conduits around the longitudinal axis define different positions of the extraction aperture along a direction of the longitudinal axis.

12. The fume extraction apparatus as defined in claim 11, wherein the inner conduit and the outer conduit are cylindrical and concentric.

13. The fume extraction apparatus as defined in claim 11, wherein the at least one first opening consists in a single elongated opening defined through the first wall, and the at least one second opening includes a row of adjacent holes defined through the second wall.

14. The fume extraction apparatus as defined in claim 11, wherein the first elongated open area extends along a direction parallel to the longitudinal axis, and the second elongated open area extends along a helical path.

15. The fume extraction apparatus as defined in claim 11, wherein the outer conduit is fixed, and the inner conduit is rotatable.

16. The fume extraction apparatus as defined in claim 11, further comprising an inlet plenum defined by an inlet wall forming a closed perimeter extending outwardly from the first wall of the outer conduit around the first elongated open area, the plenum being divided by a plurality of longitudinally spaced apart partitions.

17. The fume extraction apparatus as defined in claim 11, wherein the second elongated open area is defined by multiple openings extending through the second wall.

18. A fume extraction apparatus comprising:

an outer conduit including a first wall having a first elongated open area defined therethrough, the first elongated open area extending between two longitudinally spaced apart locations at a first angle with respect to a longitudinal axis; and an inner conduit configured for connection to a venting system and received within the outer conduit, the inner conduit and the outer conduit rotatable relative to one another about the longitudinal axis, the inner conduit having a cylindrical second wall, the first wall and the cylindrical second wall being in sealing engagement with each other around the first elongated open area, the cylindrical second wall having a second elongated open area defined therethrough, the second elongated open area extending between the two longitudinally spaced apart locations at a second angle with respect to the longitudinal axis, the first angle being different from the second angle;

wherein overlapping portions of the first elongated open area and the second elongated open area define an extraction aperture providing a fluid communication between an environment of the outer conduit and an interior of the inner conduit;

wherein the extraction aperture is movable along a direction of the longitudinal axis in a continuous manner between the two longitudinally spaced apart locations upon relative rotation of the inner and outer conduits.

19. The fume extraction apparatus as defined in claim 18, further comprising a motor drivingly engaged to one of the inner conduit and the outer conduit to perform the relative rotation therebetween.

* * * * *